Figure 1:
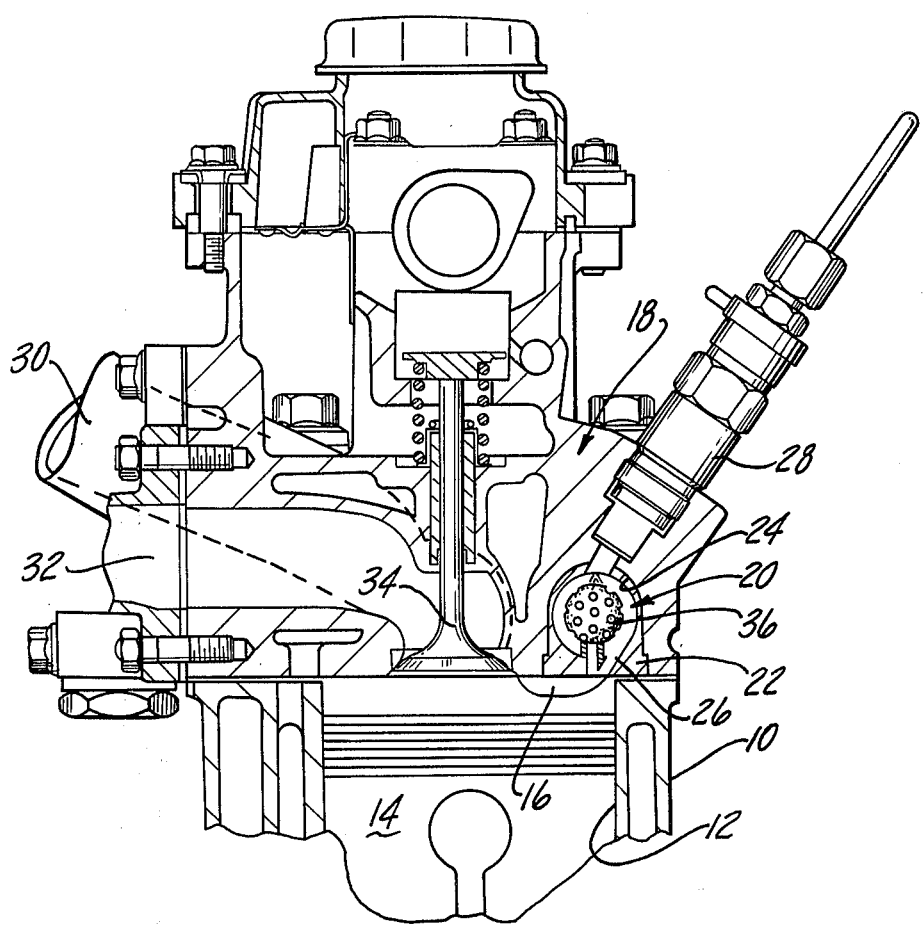

United States Patent [19]

Wade

[11] 4,421,079

[45] Dec. 20, 1983

[54] DIESEL ENGINE COMBINATION FUEL VAPORIZER AND AIR/FUEL MIXER

[75] Inventor: Wallace R. Wade, Farmington Hills, Mich.

[73] Assignee: Ford Motor Company, Dearborn, Mich.

[21] Appl. No.: 444,399

[22] PCT Filed: Sep. 30, 1982

[86] PCT No.: PCT/US82/01374
§ 371 Date: Sep. 30, 1982
§ 102(e) Date: Sep. 30, 1982

[51] Int. Cl.³ ............................................. F02B 19/08
[52] U.S. Cl. ................................... 123/255; 123/263; 123/280; 123/293
[58] Field of Search ............... 123/254, 255, 256, 263, 123/280, 293, 298

[56] References Cited

U.S. PATENT DOCUMENTS

| | | |
|---|---|---|
| 743,097 | 11/1903 | Phail ..................................... 123/255 |
| 762,960 | 6/1904 | Tuck et al. ........................... 123/255 |
| 1,081,228 | 12/1913 | Fuchs ................................... 123/255 |
| 1,129,316 | 2/1915 | Svalin .................................. 123/255 |
| 1,535,657 | 4/1925 | Ensign ................................. 123/255 |
| 1,887,072 | 11/1932 | Suder et al. . | |
| 1,939,180 | 12/1933 | Marburg ............................. 123/275 |
| 1,981,874 | 11/1934 | Mock . | |
| 2,223,090 | 11/1940 | Boxan . | |
| 2,242,274 | 5/1941 | Thysse . | |
| 2,594,681 | 4/1952 | Ricardo et al. . | |
| 2,761,431 | 9/1966 | Nallinger . | |
| 2,766,738 | 10/1956 | Hoffmann . | |
| 2,778,347 | 1/1957 | Von Mallinckrodt . | |
| 3,102,521 | 9/1963 | Slemmons . | |
| 4,071,001 | 1/1978 | Goto . | |
| 4,076,000 | 2/1978 | Goto et al. . | |

FOREIGN PATENT DOCUMENTS 36124 6/1926 Denmark .
241981 10/1912 Fed. Rep. of Germany .
714661 12/1941 Fed. Rep. of Germany .

Primary Examiner—Tony M. Argenbright
Attorney, Agent, or Firm—Robert E. McCollum; Clifford L. Sadler

[57] ABSTRACT

A diesel type prechamber has a centrally located heated tubular member supplied internally with hot air through a secondary throat or transfer passage, the air vaporizing the fuel sprayed against the outer surface of the hot member and also mixing with the vaporized fuel upon passage of the air through transpiration holes in the member.

7 Claims, 5 Drawing Figures

DIESEL ENGINE COMBINATION FUEL VAPORIZER AND AIR/FUEL MIXER

This invention relates in general to a compression-ignition type engine. More particularly, it relates to one having a combustion chamber construction that minimizes the emission of particulates.

The conventional diesel engine is of the divided combustion chamber type. A precombustion chamber formed in the cylinder head is connected by a small diameter throat or transfer passage to a smaller facing chamber located in a recess in the piston, such, for example, as is shown in U.S. Pat. No. 2,594,681, Ricardo et al. The fuel is injected or sprayed directly into the center of the prechamber into a swirling flow of air pushed into the chamber during the engine compression cycle.

While the above construction may be satisfactory for some installations, it does not always provide adequate fuel vaporization or mixing of the fuel with the air, resulting in the formation of particulates. Attempts have been made to minimize particulates by including, for example, a hot bar inserted crosswise in the prechamber and heated by the hot air flow. However, mixing of the fuel vapor with the air is limited by this construction so that particulate emissions are only slightly reduced as compared to the conventional swirl chamber type engine.

Another commercially available diesel engine includes a secondary throat or transfer passage that pushes additional air into the prechamber in an opposing direction to set up opposing swirl motions and, therefore, provide better mixing. However, again, this results in only slightly lower particulate emissions as compared to a conventional swirl chamber system.

This invention relates to a prechamber that has a heated hollow member located in the center of the chamber spaced from the chamber walls so that air flows in the clearance between the two; a portion of the outer surface of the hollow member being wet by the fuel sprayed into the chamber to vaporize the fuel; the hollow member being heated by hot air forced into the member through a secondary transfer passage during the compression cycle of the engine; the member having transpiration holes in its wall that permit the flow of the hot air outwardly into the clearance space to provide rapid mixing of the air and fuel vaporized by contact with the hot hollow member.

Constructions are known in the prior art that include hot bodies adjacent the prechamber to better vaporize the fuel injected. For example, U.S. Pat. No. 1,887,072, Suder et al, shows a domed-like member G inserted between the transfer passage and the opening to the prechamber and provided with directional holes for controlling the flow of air into the prechamber to better mix the air and fuel.

U.S. Pat. No. 1,981,874, Mock, shows in FIGS. 1 and 2 a prechamber with a conical insert against which fuel is sprayed for fogging the air/fuel mixture. FIG. 3 shows the use of a ball attached to the engine side of the valve member.

U.S. Pat. No. 2,223,090, Boxan, and U.S. Pat. No. 2,242,274, Thysse, both show the use of secondary transfer passages and an insert to provide better air/fuel mixing and vaporization.

U.S. Pat. No. 2,766,738, Hoffmann, U.S. Pat. No. 2,761,431, Nallinger, U.S. Pat. No. 2,778,347, Mallinckrodt, U.S. Pat. No. 3,102,521, Slemmons, U.S. Pat. No. 4,071,001, Goto, and U.S. Pat. No. 4,076,000, Goto et al, are further illustrations of heated bodies and angled passages to provide vaporization and mixing of the air and fuel.

It will be noted in each of the above instances that there is no separate hollow member inserted centrally within the prechamber having a hollow interior connected by a secondary transfer passage with the hot air in the main combustion chamber during the compression stroke of this engine that passes through the hollow member into the clearance space between it and the prechamber wall to mix with the vaporized fuel therein to reduce particulates, the fuel injected being sprayed against a portion of the outer surface of the hollow member to wet the same and be heated and vaporized at that point to be thereafter mixed with the air swirling around the member. The prior art references show either the use of secondary transfer passages alone, or the use of heated projecting members that are not supplied internally with secondary air in the manner described.

Other examples of engine combustion chambers containing vaporizing members are shown, for example, in German Pat. Nos. 251981, 714661, and Netherlands patent N.R. No. 36124. In each of these instances, a perforated member extends into or is adjacent the combustion chamber for receiving fuel and/or air to be directed through holes to mix the fuel and air. In these cases, however, the fuel is not sprayed directly against the outer surface of a hollow member containing hot air from the engine for passage through holes into the remaining portion of the prechamber of the engine.

Finally, U.S. Pat. No. 1,129,316, Svalin, shows a combustion chamber in which fuel is injected through an air mixing tube containing laterally directed holes that receive air during the compression cycle of the engine and eject the air/fuel mixture at other times, for mixing purposes. Again, the construction is unlike that of the invention having a heated hollow member in the prechamber against which the fuel is sprayed and vaporized and mixed thoroughly with the usual supply of hot air swirling in the prechamber and additional air ejected from the inside of the hollow member.

It is a primary object of the invention, therefore, to provide a compression ignition type engine with a prechamber that includes a heated hollow member that helps to vaporize the fuel injected or sprayed into the prechamber and mixes with the fuel air that has been transferred into the hollow member through a secondary or supplemental transfer passage.

Figure 2:
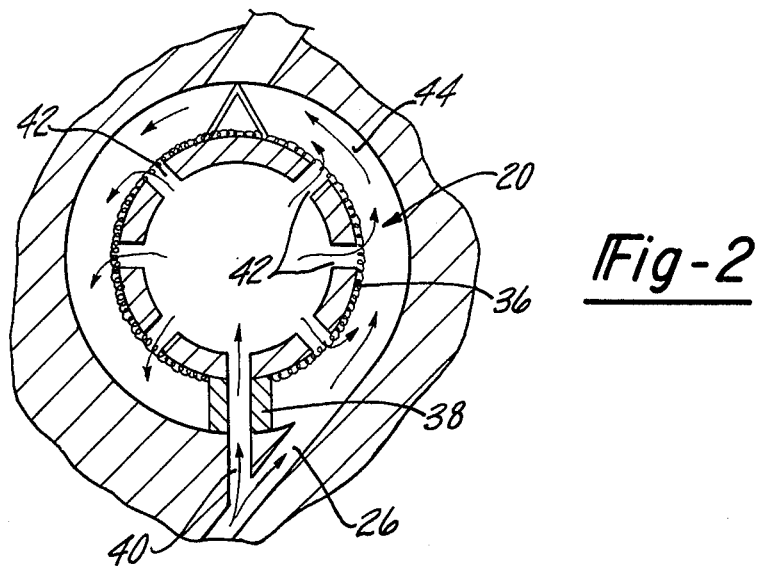
Figure 3:
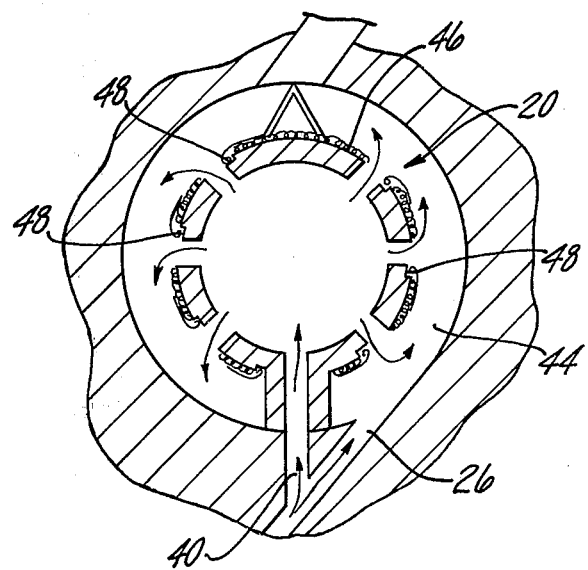
Figure 4:
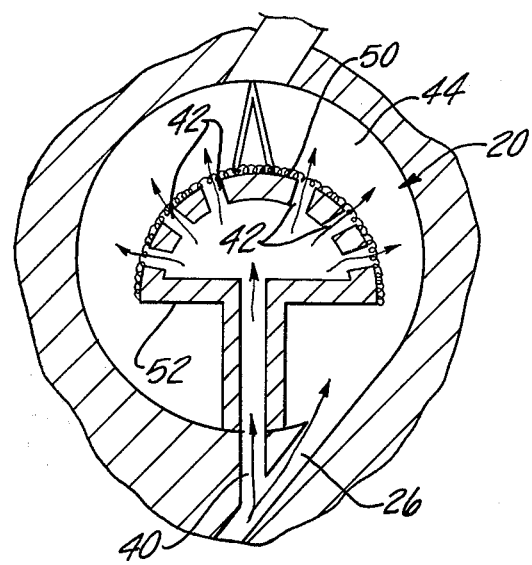
Figure 5:
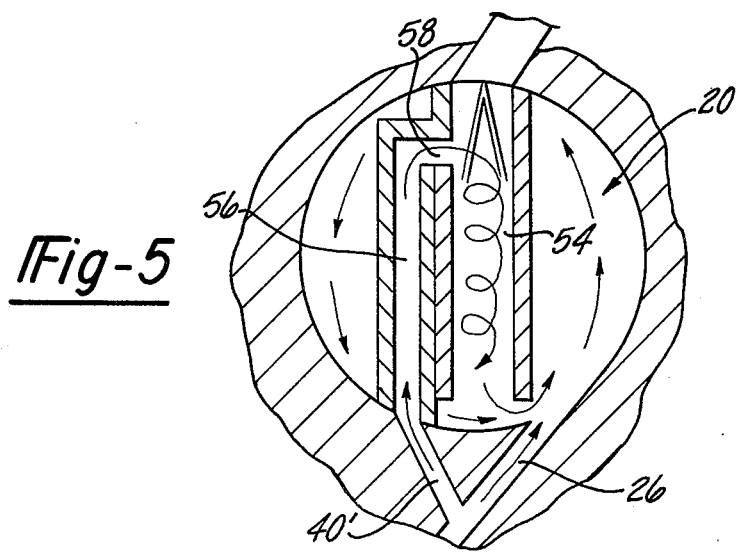

Other objects, features and advantages of the invention will become more apparent upon reference to the succeeding detailed description thereof, and to the drawings illustrating the preferred embodiments thereof; wherein, FIG. 1 is a cross-sectional view of a compression-ignition type engine embodying the invention;

FIG. 2 is an enlarged cross-sectional view of a portion of the FIG. 1 showing; and, FIGS. 3, 4 and 5 are cross-sectional views illustrating modifications of the construction shown in FIGS. 1 and 2.

Except for the construction of the prechamber, FIG. 1 illustrates a portion of an essentially conventional compression-ignition or diesel type engine. More specifically, it contains the usual engine block 10 having a cylinder bore 12 within which is slidably movable a piston 14. The upper end of piston 14 is formed with a shallow depression 16, which together with the piston face and the usual cylinder head 18 defines the main chamber of a divided combustion chamber. The other chamber 20 is defined by an insert 22 located in a recess 24 in cylinder head 18, and connected to chamber 16 by a primary throat or transfer passage 26. A conventional fuel injector 28 is adapted to spray fuel through the narrow angle indicated into the prechamber for mixing with the air that is swirled around therein in the usual manner. The cylinder head 18 contains the usual intake and exhaust passages 30 and 32, each controlled by a valve (only exhaust valve 34 shown). Further details of construction and operation of the engine per se are not given since they are known and believed to be unnecessary for an understanding of the invention.

As best seen in FIG. 2, located centrally within prechamber 20 is a hollow ball shaped member 36 that is spaced equally from the walls of prechamber 20 as shown to permit the circulation of swirling air between the two. It is located so that its outer surface will be wet by the direct spray of fuel thereagainst as shown. Hot air is connected to the interior of the ball by means of a stem like tube 38 connected to a secondary or supplemental transfer passage 40 that is branched from the main or primary throat passage 26. A number of air transpiration holes 42 bored through the wall of ball member 36 connect the hot air to the clearance space 44 during the compression cycle of the engine for mixing with the fuel vaporized in the prechamber.

It should be noted that the spacing of holes 42 where the fuel spray wets the outer surface 46 of ball 36 is circumferentially wider than the width of the fuel spray to avoid fuel rich combustion near the fuel spray. Accordingly, it will be seen that as the fuel is sprayed against the outer surface of ball 36, hot air from the interior of the ball will be forced outwardly through holes 42 during the compression stroke of the engine to mix with the vaporized fuel as it is swirling around the prechamber prior to exhaust through primary transfer passage 26 into main combustion chamber 16.

FIG. 3 shows an alternative construction in which the outer surface 46 of ball 36 adjacent the trailing edge of holes 42 are provided with stepped portions 48. The latter define ramps that set up vortices to the air and fuel motion passing into contact with these portions to provide better mixing of the air and fuel.

FIG. 4 shows a further embodiment in which hollow member 36 is constructed with a mushroom-like shape having a domed outer surface 50 that provides additional surface upon which the fuel can spread for better mixing. Additionally, the nonsymmetrical lower face portion 52 of the member provides a sharp change in direction to the flow of the air and fuel, with accompanying vortices, for additional mixing. In all other respects, this embodiment is similar in operation to that of the FIGS. 2 and 3 embodiments. Hot air is forced into the interior of the hollow member during the compression cycle of the engine and out through the transpiration holes 42 to mix with fuel heated as it contacts the hot outer surface 50 of the domed member prior to passage of the mixture out into the engine through the primary throat transfer passage 26.

FIG. 5 shows a somewhat different construction for mixing and vaporizing the fuel. In this case, fuel is injected into a small diameter premixing tube 54 supplied with hot air from a small diameter parallel passage 56 connected to a secondary inlet throat or transfer passage 40'. The air inlet 58 would apply the secondary air tangentially to tube 54 to provide a mixing action with the fuel spray, the mixture then exiting at the lower end of tube 54 to mix with the swirling air and fuel in the prechamber prior to exit through the primary throat or transfer passage 26. The mixing air flow in this case would be small enough to assure that the mixture within tube 54 is richer than the flammability limit so that combustion would not occur in the tube.

The operation of each of the embodiments described is believed to be clear from a consideration of the above description and the drawing and, therefore, will not be repeated. From the foregoing, therefore, it will be seen that the invention reduces or minimizes the production of particulates by providing a heated member located centrally in the prechamber and supplied internally with hot air for both vaporizing fuel sprayed against its outer surface and for mixing with the vaporized fuel the air that passes through holes in the member.

While the invention has been shown and described in its preferred embodiments, it will be clear to those skilled in the arts to which it pertains that many changes and modifications may be made thereto without departing from the scope of the invention.

I claim:

1. A combination fuel vaporizer and air/fuel mixer for a compression ignition type engine having a divided combustion chamber including a main chamber contiguous to the face of the engine piston and a second prechamber in the cylinder head facing the main chamber and connected to the main chamber by a throat type transfer passage for the transfer of air in a tangential manner into the prechamber from the main chamber during the compression stroke of the engine to create a swirling motion to the air in the prechamber, and means for spraying fuel into the prechamber, the improvement comprising, the prechamber having a hollow member located centrally therein in the path of fuel sprayed into the prechamber to wet a portion of the outer surface thereof, the member being spaced from the walls of the prechamber for the flow of swirl air between the prechamber and member, supplementary air transfer passage means connecting a portion of the incoming hot air from the main chamber to the interior of the member for heating the same and vaporizing fuel sprayed against the outer surface thereof, and a plurality of air transpiration holes in the wall of the member connecting the air from the interior of the member to the prechamber space surrounding the member for mixing with the fuel.

2. A fuel vaporizer and mixer as in claim 1, wherein the holes are located at locations on the outer surface other than that on which the fuel is sprayed.

3. A fuel vaporizer and mixer as in claim 2, the supplementary transfer passage means including a tube extending into the prechamber connecting air to the member from a secondary throat branched from the first mentioned transfer passage.

4. A fuel vaporizer and mixer as in claim 2, the member comprising a hollow ball having the transpiration holes circumferentially spaced from one another, the spacing of the holes adjacent the surface wet by the fuel spray being greater than the circumferential extent of the wetted surface.

5. A fuel vaporizer and mixer as in claim 3, the member including stepped edge portions in the outer wall surface contiguous to the holes for varying the air flow motion to enhance mixing of the air and fuel.

6. A fuel vaporizer and mixer as in claim 3, the member having a mushroom-like domed shape providing a large outer surface area over which the fuel sprayed thereon can be spread.

7. A fuel vaporizer and mixer as in claim 5, the edge portions comprising mixing ramps providing vortices as the air/fuel flow flows past to better mix the air and fuel.

* * * * *